United States Patent
Eberwein et al.

(10) Patent No.: US 12,547,261 B2
(45) Date of Patent: Feb. 10, 2026

(54) ROTARY CONTROL INPUT DEVICE FOR A CAPACITIVE TOUCH SCREEN

(71) Applicant: Quixant PLC, Cambridgeshire (GB)

(72) Inventors: Fabian Eberwein, Innsbruck (AT); Hans Peter Krall, Eberstein (AT)

(73) Assignee: Quixant PLC, Cambridgeshire (GB)

( * ) Notice: Subject to any disclaimer, the term of this patent is extended or adjusted under 35 U.S.C. 154(b) by 0 days.

(21) Appl. No.: 18/525,974

(22) Filed: Dec. 1, 2023

(65) Prior Publication Data

US 2024/0168577 A1  May 23, 2024

Related U.S. Application Data

(63) Continuation of application No. 17/707,419, filed on Mar. 29, 2022, now Pat. No. 11,853,492.

(30) Foreign Application Priority Data

Mar. 30, 2021 (GB) ...................... 2104541

(51) Int. Cl.
*G06F 3/039* (2013.01)
*G06F 3/0362* (2013.01)
*G06F 3/044* (2006.01)

(52) U.S. Cl.
CPC .......... *G06F 3/0393* (2019.05); *G06F 3/0362* (2013.01); *G06F 3/044* (2013.01)

(58) Field of Classification Search
CPC ....... G06F 3/0393; G06F 3/0362; G06F 3/044
See application file for complete search history.

(56) References Cited

U.S. PATENT DOCUMENTS

| | | |
|---|---|---|
| 5,936,613 A | 8/1999 | Jaeger et al. |
| 6,492,978 B1 | 12/2002 | Selig et al. |
| 8,547,340 B2 | 10/2013 | Sizelove et al. |
| 8,796,566 B2 | 8/2014 | Kerner et al. |
| 8,912,457 B2 | 12/2014 | Tseng |

(Continued)

FOREIGN PATENT DOCUMENTS

| | | |
|---|---|---|
| DE | 102017106501 A1 | 9/2018 |
| DE | 202018000111 U1 | 4/2019 |

(Continued)

OTHER PUBLICATIONS

Search Report for corresponding GB Application No. GB 2305990.0 dated Oct. 25, 2023 (2 pages).

(Continued)

*Primary Examiner* — Hang Lin
(74) *Attorney, Agent, or Firm* — Leason Ellis LLP

(57) ABSTRACT

A rotary control input device for a capacitive touch screen is disclosed. The control device comprises a mounting element for retaining the device in place on the capacitive touch screen, a circuit frame rotatably mounted on the mounting element, the circuit frame including a rotation electrode, the rotation electrode being disposed to be adjacent and spaced apart from the capacitive touch screen when the device is retained in place. The device further includes a conductive body portion that is electrically connected to the rotation electrode, the circuit frame being rotatable about the mounting element, with respect to the capacitive touch screen, by a user via the conductive body portion.

19 Claims, 3 Drawing Sheets

(56) References Cited

U.S. PATENT DOCUMENTS

| | | |
|---|---|---|
| 8,988,355 B2 | 3/2015 | Solomon et al. |
| 9,158,422 B2 | 10/2015 | Craig et al. |
| 9,317,181 B2 | 4/2016 | Sizelove et al. |
| 9,557,872 B2 | 1/2017 | Craig et al. |
| 9,836,142 B2 | 12/2017 | Craig et al. |
| 10,437,458 B2 | 10/2019 | Choi et al. |
| 10,838,525 B2 | 11/2020 | Chu et al. |
| 10,975,925 B2 | 4/2021 | Battlogg |
| 11,003,262 B2 | 5/2021 | Pfau et al. |
| 2006/0256090 A1 | 11/2006 | Huppi |
| 2011/0024276 A1 | 2/2011 | Fyke |
| 2012/0327013 A1 | 12/2012 | Lee et al. |
| 2013/0314375 A1 | 11/2013 | Rickstrom et al. |
| 2014/0247246 A1 | 9/2014 | Maus |
| 2017/0052399 A1 | 2/2017 | Guzman et al. |
| 2018/0074639 A1 | 3/2018 | Powell et al. |
| 2018/0136738 A1 | 5/2018 | Argiro |
| 2018/0164903 A1 | 6/2018 | Chu et al. |
| 2019/0146594 A1* | 5/2019 | Nakagawa ............ G06F 3/0202 345/174 |
| 2019/0391671 A1 | 12/2019 | Pfau et al. |
| 2020/0117288 A1 | 4/2020 | Lopez et al. |
| 2020/0174586 A1 | 6/2020 | Yoshihara |
| 2021/0048845 A1 | 2/2021 | Hinson et al. |
| 2022/0057237 A1* | 2/2022 | Mochiji .................. G06F 3/044 |

FOREIGN PATENT DOCUMENTS

| | | |
|---|---|---|
| DE | 102019001842 A1 | 9/2020 |
| DE | 102019124582 A1 | 3/2021 |
| EP | 3112996 A1 | 1/2017 |
| EP | 3961927 A1 | 3/2022 |
| WO | 2009036375 A1 | 3/2009 |
| WO | 2019116003 A1 | 6/2019 |
| WO | 2019182776 A1 | 9/2019 |

OTHER PUBLICATIONS

Search Report for corresponding GB Application No. GB 2104541.4 dated Mar. 17, 2025 (3 pages).
Search Report for corresponding GB Application No. GB 2104541.4 dated Jun. 5, 2025 (6 pages).
Rutter et al., "Turnector: Tangible ControlWidgets for Capacitive Touchscreen Devices", Proceedings ICMC, Athens, Greece, Sep. 2014, pp. 785-789.
Search Report for corresponding GB Application No. GB210451.4 dated Nov. 13, 2025 (6 pages).

* cited by examiner

ROTARY CONTROL INPUT DEVICE FOR A CAPACITIVE TOUCH SCREEN

CROSS-REFERENCE TO RELATED APPLICATION

This application is a continuation of U.S. application Ser. No. 17/707,419 filed Mar. 29, 2022, now allowed, which claims priority under 35 U.S.C. § 119 to GB Patent Application No. 2104541.4 filed Mar. 30, 2021, the contents of which are hereby incorporated by reference in its entirety as if set forth herein.

FIELD OF THE INVENTION

The present invention related to a rotary control input device for a capacitive touch screen that is particularly applicable for use in complex interfaces and those in which a user might be navigating only or primarily by touch.

BACKGROUND

Capacitive touch screens are an increasingly common input method for software and computer based systems across many industries and applications. They offer versatility, simplicity of operation, and compactness.

For complex operations such as audio mixing, however, there are a number of problems with the use of touch screen controls.

Firstly, manual operation of a touch screen is unable to provide the degree of precision of traditional controls such as potentiometers, shaft encoders, linear faders, and electromechanical switches.

Secondly, the lack of tactile feedback provided by a touch screen does not allow the development of motor memory, essential to enable a user to concentrate on complex tasks while interacting with the control interface.

There exist tactile switches for touch screens. Typically, they include an actuator, such as a switch or button, and a sensing electrode. The actuator has a user contact surface that is electrically connected to an electrode. When the actuator is pressed by a user the circuit is completed and a capacitance is induced between the electrode and the capacitive touch screen, generating an input in the receiving software. However, switches alone can only provide so much functionality.

It is therefore desirable to provide other input mechanisms for touch screens such as rotary input devices as a means of interaction for complex operations, such as audio mixing, particularly a mechanism capable of providing precision control and tactile feedback.

STATEMENT OF INVENTION

According to an aspect of the present invention, there is provided a rotary control input device for a capacitive touch screen, comprising a mounting element for retaining the device in place on the capacitive touch screen, a circuit frame rotatably mounted on the mounting element, the circuit frame including a rotation electrode, the rotation elect rode being disposed to be adjacent and spaced apart from the capacitive touch screen when the device is retained in place, wherein the device further includes a conductive body portion that is electrically connected to the rotation electrode, the circuit frame being rotatable about the mounting element, with respect to the capacitive touch screen, by a user via the conductive body portion.

The circuit frame may be mounted on the mounting element to maintain a substantially predetermined distance between the rotation electrode and the capacitive touch screen.

The rotary control input device may further comprise a spacer disposed between the mounting element and the circuit frame to maintain the spacing between the rotation electrode and the capacitive touch screen.

The rotary control input device may further comprise a spacer configured, when the device is in use, to be disposed between the capacitive touch screen and the circuit frame to maintain the spacing between the rotation electrode and the capacitive touch screen.

A surface of the circuit frame may include a recess, within which the rotation electrode is disposed.

The rotary control input device may further comprise a non-conductive film disposed, when in use, between the rotation electrode and the capacitive touch screen to maintain the predetermined distance. The predetermined distance may be in the range of substantially 0.05 to 0.20 mm.

The rotary control input device may further comprise a sealing element to engage the capacitive touch screen about a periphery of the rotary input control device.

The sealing element may comprise a light diffusing material.

The sealing element may be configured to inhibit ingress of moisture and foreign bodies into the rotary control input device.

The rotary control input device may further comprise a first further electrode, wherein the conductive body portion is actuable to electrically connect to the first further electrode. The rotary control input device may further comprise a second further electrode, wherein the conductive body portion has first and second actuation positions, each actuation position electrically connecting to the respective first and second further electrodes in succession. The device may include a resistively deformable member configured to resist said actuation.

The conductive body portion may comprise a knob or it may be part of the circuit frame.

The rotary control input device may further comprise a light guide configured to redirect light entering the control input device at or about the mounting element. The light guide may be configured to redirect light to illuminate part of the rotary control input device.

Embodiments of the present invention seek to provide high precision rotary knobs for use within the active display/touch area of an LCD display so graphics and text can be located immediately adjacent to the button, and also the area behind the knob. Precision in this context covers parameters such as: low starting torque for rotation, low or zero constant torque during rotation, very low backlash, and good angular resolution of incremental rotation.

To provide this precision and to solve the problem of tactile feedback through operational control objects, the inventors have invented a rotary knob that conducts human capacitance through a user contact area to an electrode which is not in contact with the capacitive touchscreen. This feature means that the electrodes do not wear against the glass of the touch screen.

These electrodes induce a capacitance in the touch sensor which enables the position of the electrode to be detected and through software and firmware. This allows the user to provide input to the system by virtue of the angular position of the rotary knob.

Optionally, the knob can be provided with a push button operation that operates in addition to the rotational control to give the control device dual functionality. The manner in which the push button functionality is implemented and in which the knob is mounted means that embodiments avoid z-axis movement (pressing) of the knob being translated into rotation.

BRIEF DESCRIPTION OF THE DRAWINGS

Embodiments of the present invention will now be described by way of example only and with reference to the accompanying drawings in which.

DETAILED DESCRIPTION

Figure 1:
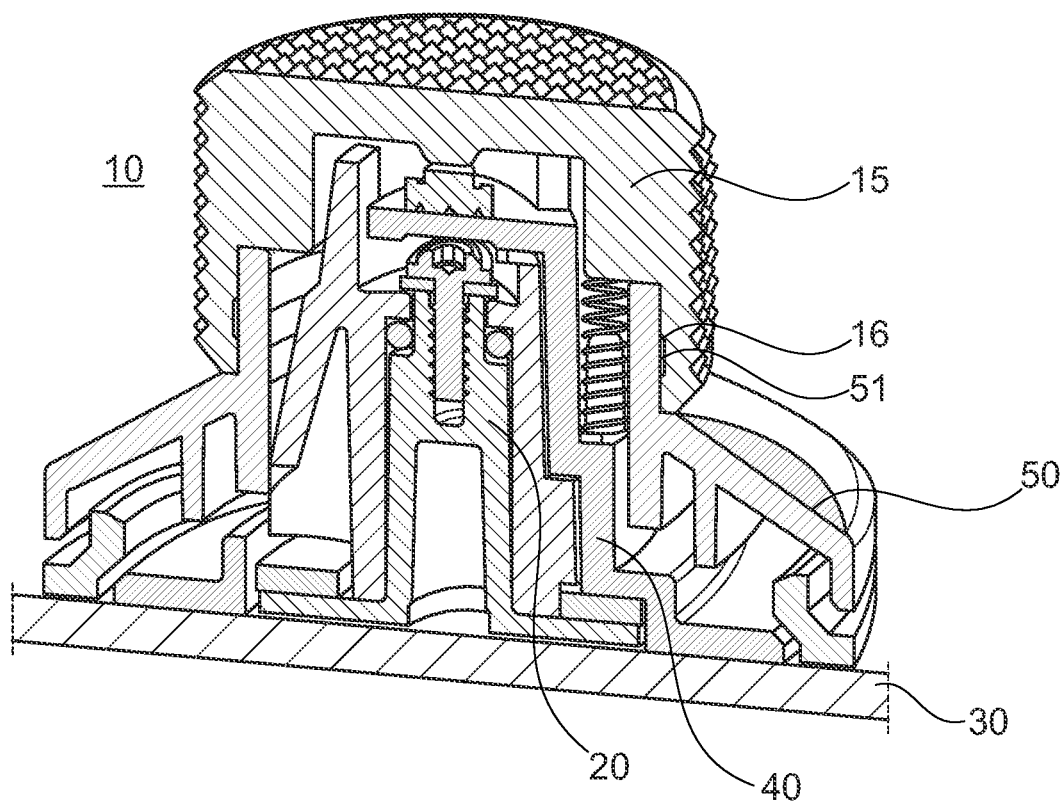
FIG. 1 is a cross-sectional view of a rotary control input device according to one embodiment.

FIG. 1 is a cross-sectional view of a rotary control input device according to one embodiment.

The rotary control input device 10 includes a mounting element 20 for retaining the device in place on a capacitive touch screen 30 and a circuit frame 40 rotatably mounted on the mounting element 20.

The circuit frame 40 includes a rotation electrode 45, the rotation electrode being disposed to be adjacent and spaced apart from the capacitive touch screen 30 when the device 10 is retained in place.

The device 10 includes a conductive body portion 15 that is electrically connected to the rotation electrode 45. The circuit frame 40 is rotatable about the mounting element 20, with respect to the capacitive touch screen 30, by a user via the conductive body portion 15.

In this embodiment, the conductive body portion 15 is in the form of a separate knob that is connected to the circuit frame 40. However, it will be appreciated that it may be an integrally moulded piece and/or something that is electroplated or otherwise formed as part of the circuit frame 40.

Due to the mounting of the circuit frame on the mounting element, the rotation electrode is positioned adjacent to the touch screen but such that it is offset from it and spaced apart even when being rotated. It has been identified that contact is not necessary for the capacitive charge to be detected by the touch screen 30 and this arrangement reduced wear and tear on both the control device 10 and the touch screen 30. Preferably the rotation electrode is maintained at a predetermined distance from the touch screen 30 such as 0.05 to 0.2 mm, although it will be appreciated that these distances could be varied and also need not be constant during rotation.

The knob may include a slot 16 that engages with a projection 51 in a body 50 of the device to prevent accidental removal of the knob.

The mounting element is preferably fixedly mounted onto the capacitive touch screen 30 such as by adhesive tape. It could be moveable and/or removeable in certain uses cases but would need to be weighted enough or have some other mechanism for being held in place during use.

Figures 2A, 2B:
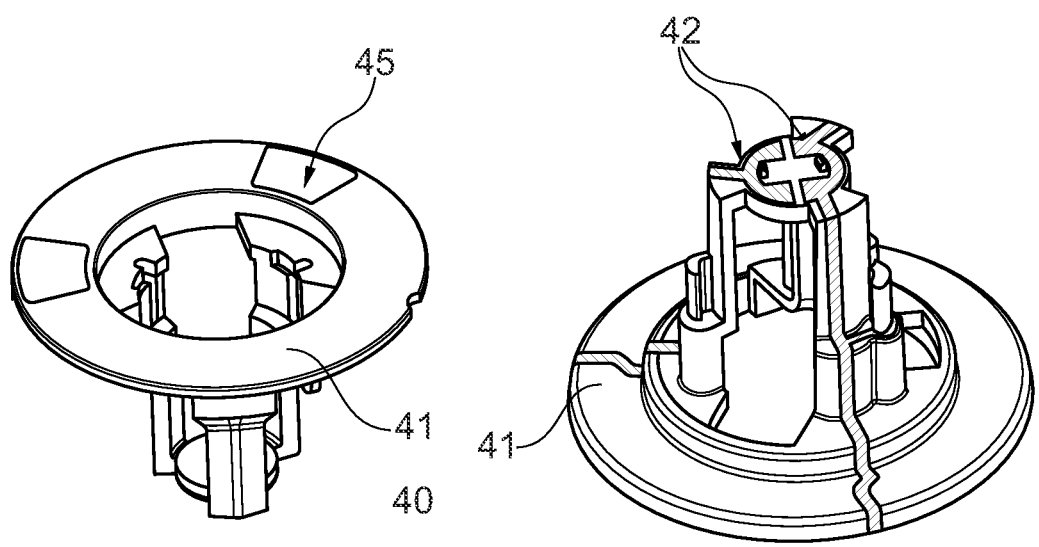
FIGS. 2a and 2b are perspective views of a circuit frame suitable for use in the embodiment of FIG. 1.

FIGS. 2a and 2b are perspective views, from below and above, of a circuit frame 40 suitable for use in the device of FIG. 1.

In this embodiment, the circuit frame has a non-conductive body 41 on which are plated, integrally moulded or otherwise attached to circuitry such an electrically conductive track or wire 42 that connects to the rotation electrode 45 which again may be integrally moulded or otherwise held or attached to the circuit frame 40.

In this embodiment, the knob 15 is electrically conductive (formed or machined from a metal or is metal plated, for example) and engages the circuit frame at the end opposite the rotation electrode 45. The track 42 electrically connects the knob 15 to the rotation electrode 45.

Preferably, the circuit frame is formed from a non-conductive plastic and the circuitry is moulded interconnect (MID) technology.

The electrical connection from the knob to the rotation electrode means that a user turning the knob 45 with his or her fingers causes a capacitive change via the electrode on the capacitive touch screen 30. As the knob is rotated by the user's fingers, this causes the rotation electrode 45 to rotate with respect to the capacitive touch screen 30 and in turn the capacitive change from the electrode moving around the surface of the touch screen 30 will be detected by the touch screen in the same way as change in electrical field due to presence of a user's finger.

Figure 3:
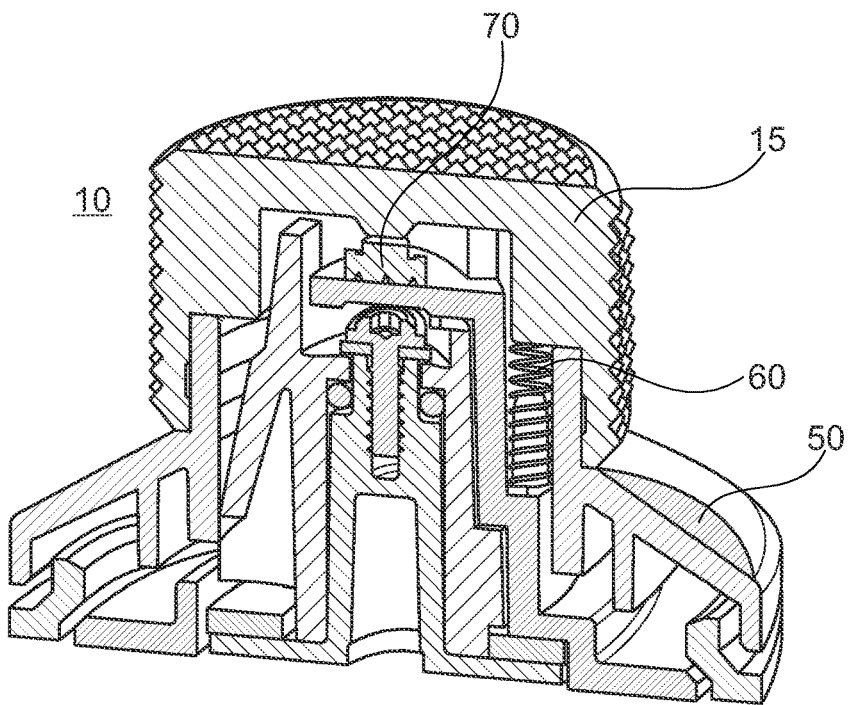
FIG. 3 is a cross-sectional view of a rotary control input device additionally incorporating a push button control according to one embodiment.

FIG. 3 is a cross-sectional view of an embodiment illustrating additional, optional features.

In this embodiment, the device allows multiple control operations. It provides a rotational controller as explained above in connection with FIGS. 1 and 2 and also a push button control as explained below.

The device 10 includes a conductive spring 60 (preferably it includes multiple springs distributed about the mounting element 20) to provide support to the knob and also enable it to be pressed by the user towards the touch screen.

The spring is preferably conductive so that it can be part of the circuitry discussed in FIG. 1, permanently connecting the knob 15 to the rotation electrode 45.

Figure 4:
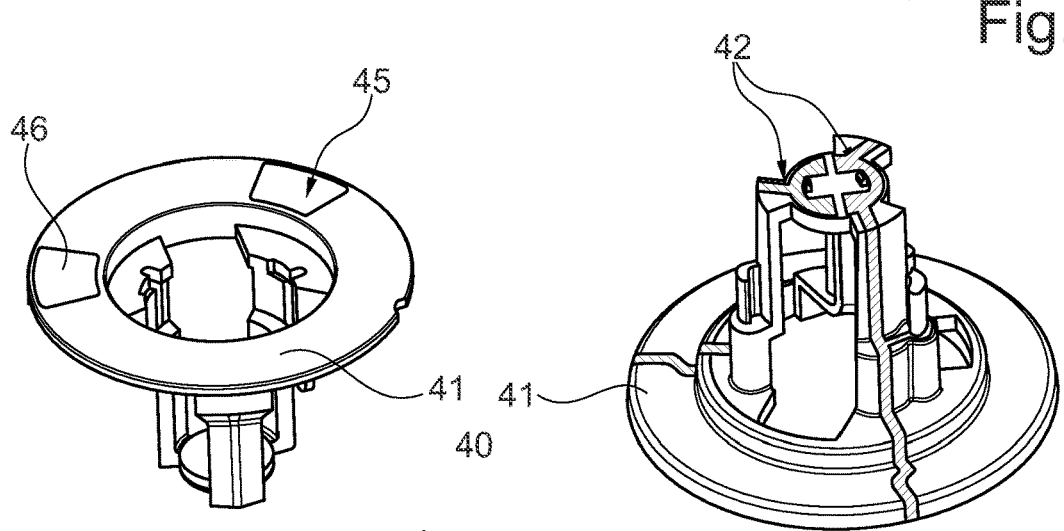
FIG. 4 shows perspective views of a circuit frame suitable for use in the embodiment of FIG. 3 supporting multiple control operations.

In this embodiment, the device includes a non-latching tactile switch 70 that is actuated when the knob 15 is depressed. Actuating the switch electrically connects a first further electrode 46 (shown in FIG. 4) positioned on the circuit frame adjacent the touch screen and results in both the rotation electrode and the first further electrode 46 being subject to capacitive charge and detected by the touch screen. Appropriate control logic or software can be configured to differentiate between rotation, actuation of the tactile switch or both:

| | |
|---|---|
| Rotation: | rotation electrode has capacitive charge and is moving across the touch screen; |
| Tactile switch actuation: | rotation electrode and first further electrode have capacitive charge; |
| Rotation and tactile switch actuation: | rotation electrode and first further electrode have capacitive charge and are moving across the touch screen. |

Optionally, the device may have a two-stage push button control. In such an arrangement, the tactile switch has two actuation positions—a first where the tactile switch has been actuated a predetermined amount and the first further electrode is connected and a second position where further travel of the knob causes the tactile switch 70 to reach a second position and additionally connect a second further electrode.

As an alternative to connecting multiple electrodes, different levels of depression of the tactile switch may electrically connect different electrodes about the circuit frame and the position of the knob press can be determined from which of the electrodes are connected (the electrode spacing from the rotation electrode so that the different electrodes can be differentiated). A constellation pattern could be used in which different positions/distances can be used to differentiate active electrodes.

Figure 5:
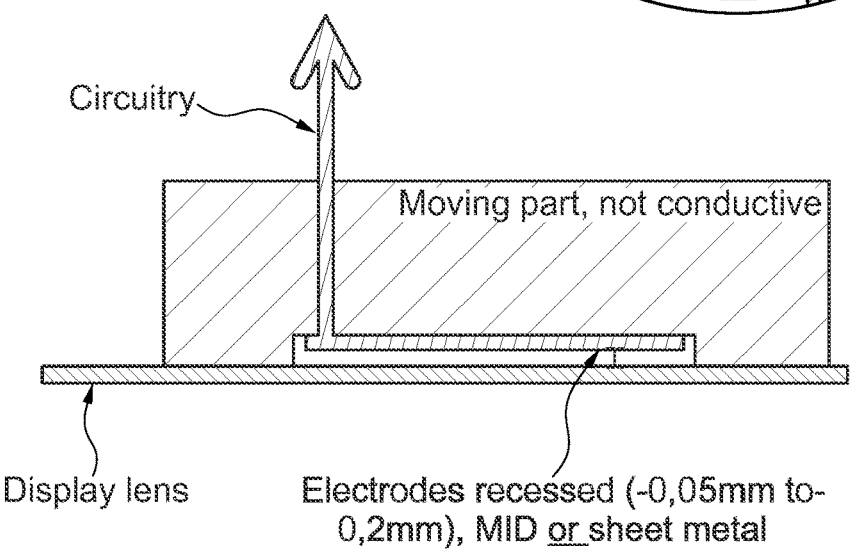
FIG. 5 is an illustration of part of an example circuit frame that is suitable for use in embodiments; and, FIGS. 6 and 7 are cross-sectional views of rotary control input devices according to further embodiments.

As discussed above in connection with FIG. 1, due to the mounting of the circuit frame on the mounting element, the rotation electrode is positioned adjacent to the touch screen but such that it is offset from it and spaced apart even when being rotated. Although this feature can be implemented simply by having the circuit frame offset slightly from the screen when mounted on the mounting element, there are various additions that can be made depending on the touch screen and environment of use. For example, the rotation electrode (and any further electrodes if the control device also supports the push button feature of FIG. 3) can be seated in recess of the circuit frame that faces the touch screen when mounted on the mounting element as is shown in FIG. 5.

Additionally or alternatively, a non-conductive film may be disposed between the rotation electrode and the capacitive touch screen to protect the touch screen. The electrodes in such an arrangement could be permanently in contact with the film or the film could be provided so as to protect the screen from being accidentally being caught by the rotation electrode or the circuit frame while rotating.

Optionally, a spacer may be positioned between the circuit frame and the mounting element to maintain a predetermined distance (and in turn maintain the spacing of the rotation electrode from the capacitive touch screen). The spacer may be formed from or include a low-friction material or coating such as PTFE to facilitate rotation of the circuit frame thereon.

Figure 6:
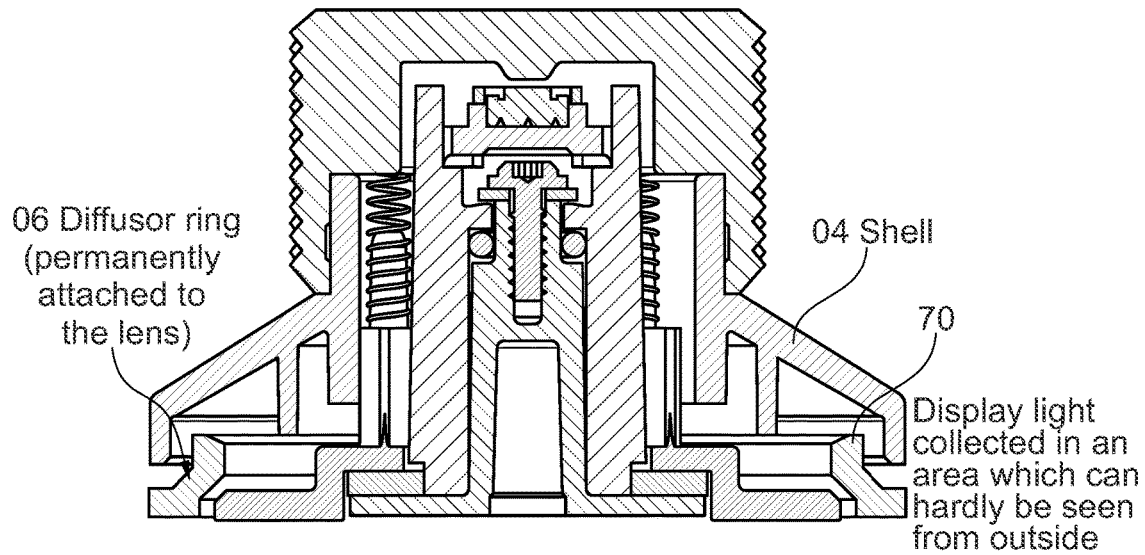

Features of further optional features of an embodiment are illustrated in FIG. 6. In this embodiment (which incorporated the rotational control of FIG. 1 and also, preferably, the push button feature of FIG. 3, a diffusor element 70 engages the capacitive touch screen about a periphery of the rotary input control device. The diffusor element is formed from, or includes, a light diffusing material such that illumination from the touch screen under the control 10 escapes via the diffusor element and illuminates the periphery of the control.

It will be appreciated that other ways of using light from the touchscreen can also be contemplated. For example, a light pipe or other light guide could be used to redirect light entering the control. The light could be used to illuminate part of the control such as the seal area around its base, part of the knob etc. It will be appreciated that this arrangement could also be used to implement status indicators—the control being positioned in a specific known position on the touchscreen (or its position worked out from the electrode(s)) and from this known portions of the touchscreen can be mapped to lightpipes (or other light guides) and operated to turn on/off indicators or other light based features in the control itself. For example, a status indicator on the knob could be linked to a specific location on the touchscreen and when that location is illuminated on the touchscreen, light is redirected to illuminate the status indicator.

Figure 7:
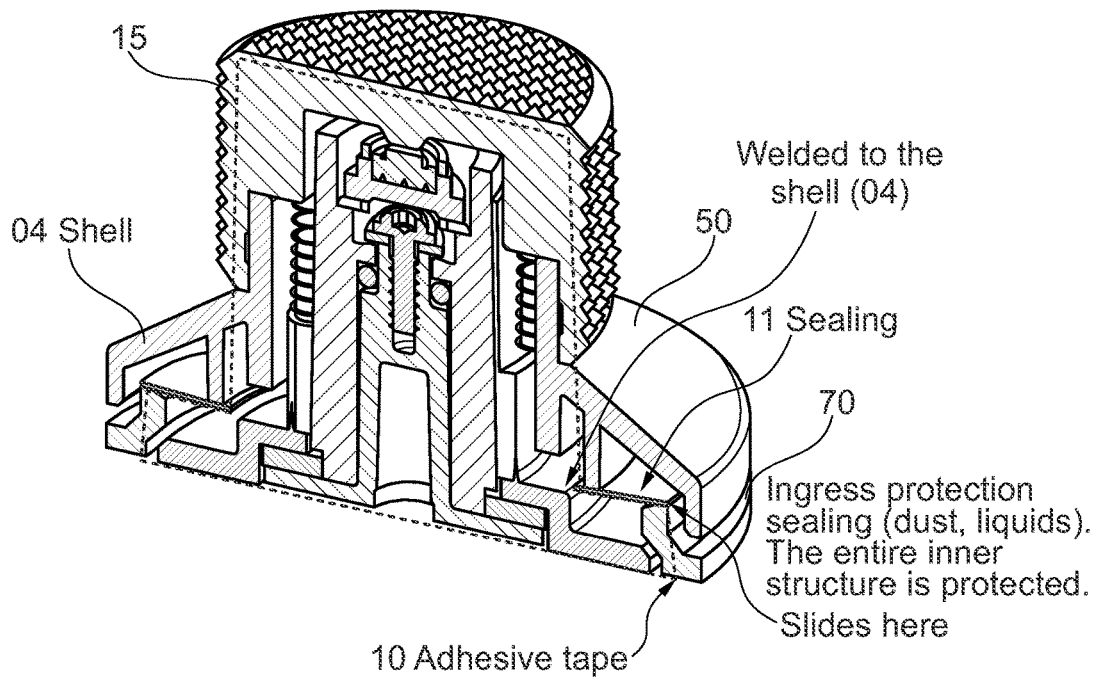

Further optional features that can be included in the embodiment of FIG. 6 are shown in FIG. 7.

Preferably, the diffusor element 70 is part of a sealing arrangement for the device 10 that provides a seal against moisture and foreign bodies entering into the rotary control input device 10. The seal could be IP rated. The sealing arrangement is shown in FIG. 7 by the dotted line and includes the diffusor element 70, the device body 50 and the knob 15.

It will be appreciated that where a light diffusing effect is not wanted, the diffuser could be substituted with a non-light-diffusing element to maintain the sealing arrangement.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A rotary control input device for a capacitive touch screen, comprising:
   a mount connected to the capacitive touch screen;
   a circuit frame rotatably mounted on the mount;
   a rotation electrode as part of the circuit frame, the rotation electrode being disposed to be adjacent and spaced apart from the capacitive touch screen when the rotary control input device is retained in place,
   at least one shoulder included as part of the mount, the shoulder providing a guide to the rotation of the circuit frame and maintaining a substantially predetermined distance between the rotation electrode and the capacitive touch screen; and
   a conductive body portion electrically connected to the rotation electrode, the circuit frame being rotatable about the mounting element, with respect to the capacitive touch screen, by a user via the conductive body portion;
   a non-conductive film disposed between the rotation electrode and the capacitive touch screen to protect the touchscreen and maintain the predetermined distance during rotation of the electrode over the non-conductive film.

2. The rotary control input device of claim 1, further comprising a spacer disposed between the mount and the circuit frame to maintain the spacing between the rotation electrode and the capacitive touch screen.

3. The rotary control input device of claim 1, further comprising a spacer configured, when the device is in use, to be disposed between the capacitive touch screen and the circuit frame to maintain the spacing between the rotation electrode and the capacitive touch screen.

4. The rotary control input device of claim 1, wherein a surface of the circuit frame includes a recess, within which the rotation electrode is disposed.

5. The rotary control input device of claim 1, wherein the predetermined distance is in the range of substantially 0.05 to 0.20 mm.

6. The rotary control input device of claim 1, further comprising a sealing element positioned to engage the capacitive touch screen about a periphery of the rotary control input device, the sealing element being fixed to the capacitive touch screen and provides a barrier extending away from the capacitive touch screen surface about the periphery of the rotary control input device to inhibit ingress of moisture and foreign bodies into the rotary control input device.

7. The rotary control input device of claim 6, wherein the sealing element comprises a light diffusing material.

8. The rotary control input device of claim 1, further comprising a first further electrode, wherein the conductive body portion is actuable to electrically connect to the first further electrode.

9. The rotary control input device of claim 8, wherein the device includes a resistively deformable member configured to resist said actuation.

10. The rotary control input device of claim 1, wherein the conductive body portion comprises a knob.

11. The rotary control input device of claim 1, wherein the conductive body portion is part of the circuit frame.

12. The rotary control input device of claim 1, further comprising a light guide configured to redirect light entering the control input device at or about the mounting element.

13. The rotary control input device according to claim 12, wherein the light guide is configured to redirect light to illuminate part of the rotary control input device.

14. A rotary control input device for a capacitive touch screen, comprising:
 a mount connected to the capacitive touch screen;
 a circuit frame rotatably mounted on the mount;
 an external body circumscribing the mount and circuit frame disposed on and engaging the capacitive touch screen, wherein the circuit frame is rotatable within the external body;
 a rotation electrode as part of the circuit frame, the rotation electrode being disposed to be adjacent and spaced apart from the capacitive touch screen when the rotary control input device is connected to the capacitive touch screen; and
 a conductive body portion that is electrically connected to the rotation electrode, wherein the circuit frame is rotatable about the mount, with respect to the capacitive touch screen, by a user via the conductive body portion;
 a non-conductive film disposed between the rotation electrode and the capacitive touch screen to protect the touchscreen and maintain the predetermined distance during rotation of the electrode over the non-conductive film.

15. The rotary control input device of claim 14, further comprising a sealing element associated with the external body to secure the external periphery of the rotary control input device about the capacitive touch screen and providing a barrier extending away from the capacitive touch screen surface, the sealing element, and the conductive body portion forming a seal to an interior of the rotary control input device.

16. The rotary control input device of claim 15, wherein the sealing element includes a diffusor formed from or including a light diffusing material, whereby illumination from the capacitive touch screen under the rotary control input device escapes via the diffusor and illuminates at least a part of the periphery of the rotary control input device.

17. The rotary control input device of claim 16, further comprising a light pipe to redirect light from the capacitive touch screen entering from under the rotary control input device, the light pipe directing the light to illuminate part of the rotary control input device.

18. The rotary control input device of claim 17, the rotary control input device further comprising a status indicator configured to be illuminated by a predetermined portion of the capacitive touchscreen.

19. The rotary control input device of claim 14, wherein the non-conductive film is formed from or includes a low-friction material or coating, and wherein the circuit frame rotates on the non-conductive film.

* * * * *